S. Stanton,
Sawing Stone.
N° 79,608. Patented July 7, 1868.
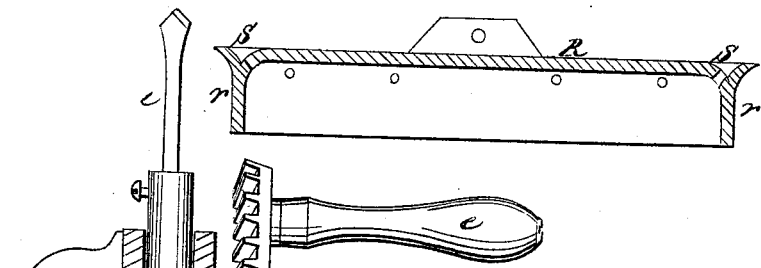
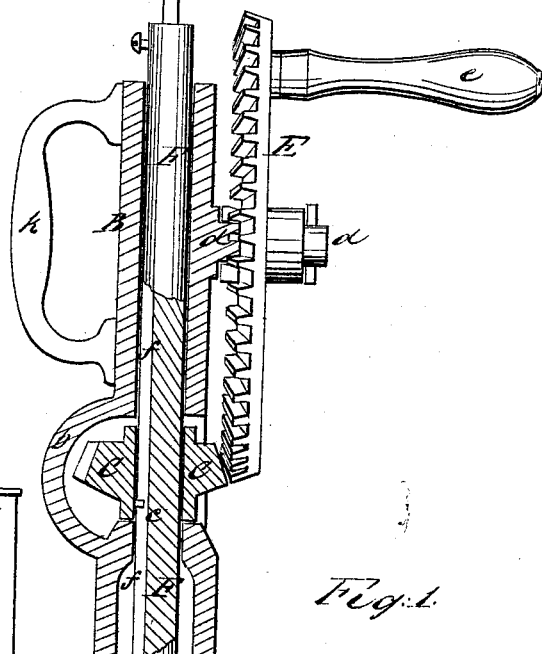
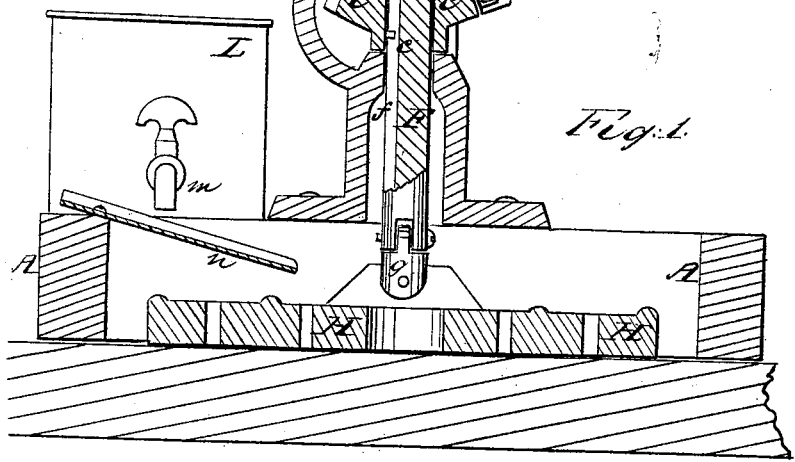
Witnesses
G. L. Miller
N. T. Healy
Inventor
Sidney Stanton
per H. A. Morley
Atty

United States Patent Office.

SIDNEY STANTON, OF SYRACUSE, NEW YORK.

Letters Patent No. 79,608, dated July 7, 1868.

IMPROVED MACHINE FOR SAWING STONE.

The Schedule referred to in these Letters Patent and making part of the same.

TO ALL WHOM IT MAY CONCERN:

Be it known that I, SIDNEY STANTON, of Syracuse, in the county of Onondaga, and State of New York, have invented a new and improved Stone-Sawing, Drilling, and Polishing Machine; and I do hereby declare that the following is a full, clear, and exact description thereof, which will enable those skilled in the art to make and use the same, reference being had to the accompanying drawings, forming a part of this specification, in which—

Figure 1 is a central vertical section of my invention, and

Figure 2 is a detail view.

The object of this invention is to produce a cheap and simple device which will facilitate the working of stone by hand-labor, as hereinafter explained.

In the accompanying drawings, A is a wooden frame, on which is mounted a hollow standard, B. This standard has a swell or chamber, $b$, for accommodating a bevelled pinion, C, and has also a wrist, $d$, for holding a bevelled driving-gear, E $e$. The hollow standard B is occupied by a shaft, F, which has a universal joint, $g$, at its lower end, for connecting with a rubbing-disk, H, (or with a circular saw, as shown in fig. 2,) and has a drill, $i$, at its opposite end. The standard B is also provided with a handle, $k$. L is a water-vessel or box, having a cock, $m$, and $n$ is a chute, for conveying water to the tool. P P represents a slab of marble, which is being operated upon.

The machine is placed so that the frame A rests upon the face of the work, and, when polishing or facing, the machine is pushed about over the face of the work by the handle $k$ as the work progresses. The operator turns the crank $e$ with one hand, and steadies the machine with the other hand, placed on handle $k$. The pinion C has a pin, $c$, which engages with a longitudinal slot, $f$, in the shaft F, so that the pinion has control of the shaft to turn it, but the shaft is free to move vertically, and, for drilling, sawing, or rubbing, the shaft feeds freely down to the work with the tool. The rubbing-disk H is rotated by crank $e$, and water is supplied by waste-cock $m$, and sand, in the usual manner. For drilling holes through slabs of stone, for pipes or screws, &c., the rubber H is disconnected from the lower end of shaft F, and the shaft is then taken out of the hollow standard B, and its end changed, so that the drill $i$ is brought down to the work. The weight of the shaft F feeds the drill down when in operation, but additional weight can be secured to the upper end of the shaft, if greater feed-pressure is desired. The saw is used to cut circular holes in slabs of marble, for wash-basins, &c., and the saw used consists in a ring or hanging flange, $r\ r$, fig. 2, which is attached to a disk, R, the water from the upper side of the disk running into a V-shaped groove, S, and thence down the saw $r$. The machine is clamped to the slab, when sawing, by a common wood-screw clamp.

What I claim as new, and desire to secure by Letters Patent, is—

The frame A, hollow standard B $b\ k$, gears E $e$, C $c$, shaft F $f\ g$, water-box L, and chute $n$, all constructed, arranged, and operating in the manner shown, and for the purpose described.

The above specification of my invention signed by me, this 27th day of March, 1868.

SIDNEY STANTON.

Witnesses:
G. L. MILLER,
F. A. MORLEY.